United States Patent
Smeltzer

[19]

[11] Patent Number: 6,164,570

[45] Date of Patent: *Dec. 26, 2000

[54] SELF-SUPPORTING RECONFIGURABLE HOSE

[75] Inventor: Steve Norman Smeltzer, Coeur d'Alene, Id.

[73] Assignee: Water Pik, Inc., Newport Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,738

[22] Filed: Aug. 15, 1997

Related U.S. Application Data

[63] Continuation of application No. 08/308,404, Nov. 14, 1994, abandoned.

[51] Int. Cl.⁷ .................................................. B05B 15/08

[52] U.S. Cl. ......................................... 239/588; 138/120

[58] Field of Search .............................. 285/384.1, 381.4, 285/382.4; 138/118, 120, 121; 239/587.3, 587.2, 587.6, 588

[56] References Cited

U.S. PATENT DOCUMENTS

| | | |
|---|---|---|
| 203,094 | 4/1878 | Wakeman ................................ 138/120 |
| D. 374,733 | 10/1996 | Santasiero . |
| 428,023 | 5/1890 | Schoff . |
| 445,250 | 1/1891 | Lawless . |
| 486,986 | 11/1892 | Schinke . |
| 566,410 | 8/1896 | Schinke . |
| 570,405 | 10/1896 | Jerguson et al. . |
| 800,802 | 10/1905 | Franquist . |
| 832,523 | 10/1906 | Andersson . |
| 1,001,842 | 8/1911 | Greenfield . |
| 1,003,037 | 9/1911 | Crowe . |
| 1,018,143 | 2/1912 | Vissering . |

(List continued on next page.)

FOREIGN PATENT DOCUMENTS

| | | |
|---|---|---|
| 659510 | 3/1963 | Canada . |
| 167 063 | 1/1986 | European Pat. Off. . |
| 0 683 354 | 11/1995 | European Pat. Off. . |
| 0687 851 | 12/1995 | European Pat. Off. . |
| 0 695 907 | 2/1996 | European Pat. Off. . |
| 0721 082 | 7/1996 | European Pat. Off. . |
| 538538 | 6/1922 | France . |
| 1098836 | 8/1955 | France . |
| 352813 | 5/1922 | Germany . |
| 2360534 | 6/1974 | Germany . |
| 2806093 | 8/1979 | Germany . |
| 32 46 327 A1 | 12/1982 | Germany . |
| 327400 | 7/1936 | Italy . |
| 350359 | 7/1937 | Italy . |
| 8902957 | 6/1991 | Netherlands . |
| 3314 | 12/1914 | United Kingdom . |
| 634483 | 3/1950 | United Kingdom . |
| 10086 | 2/1988 | United Kingdom . |
| WO 93/12894 | 7/1993 | WIPO . |
| WO 93/25839 | 12/1993 | WIPO . |

*Primary Examiner*—Kevin Weldon
*Attorney, Agent, or Firm*—Dorsey & Whitney LLP

[57] ABSTRACT

The reconfigurable self-supporting hose allows the user to select the position of the sprayer, as well as the direction of the water spray from the sprayer, or shower head. The position of the shower head and the direction of spray from the shower head can be adjusted to remain in the desired position until modified by the user. A self-supporting arm structure is selectively configurable along at least portions of its length to temporary fixed positions, the structure having a first end and a second end, and having a fluid transport path for transporting fluid from the first end to the second end. The first end of the arm structure is connected to the liquid source in fluid communication with the fluid transport path. The second end of the arm structure can be connected to a sprayer. The self-supporting outer structure can include a plurality of interconnected bead members each moveable with respect to adjacent bead members. The liquid source can be a shower pipe or a plumbing fixture positioned adjacent to a sink.

2 Claims, 7 Drawing Sheets

U.S. PATENT DOCUMENTS

| | | |
|---|---|---|
| 1,217,254 | 2/1917 | Winslow . |
| 1,218,895 | 3/1917 | Porter . |
| 1,255,577 | 2/1918 | Berry . |
| 1,276,117 | 8/1918 | Riebe . |
| 1,451,800 | 4/1923 | Agner . |
| 1,469,528 | 10/1923 | Owens . |
| 1,500,921 | 7/1924 | Bramson et al. . |
| 1,560,789 | 11/1925 | Johnson et al. . |
| 1,597,477 | 8/1926 | Panhorst . |
| 1,695,263 | 12/1928 | Jacques . |
| 1,736,160 | 11/1929 | Jonsson . |
| 1,758,115 | 5/1930 | Kelly ................................. 239/587.3 |
| 1,821,274 | 9/1931 | Plummer . |
| 2,024,930 | 12/1935 | Judell . |
| 2,117,152 | 5/1938 | Crosti . |
| 2,196,783 | 4/1940 | Shook . |
| 2,197,667 | 4/1940 | Shook . |
| 2,268,263 | 5/1941 | Newell et al. . |
| 2,342,757 | 2/1944 | Roser . |
| 2,546,348 | 3/1951 | Schuman . |
| 2,664,271 | 12/1953 | Arutunoff . |
| 2,680,358 | 6/1954 | Zublin . |
| 2,759,765 | 8/1956 | Pawley ................................. 239/580 |
| 2,776,168 | 1/1957 | Schweda . |
| 2,873,999 | 2/1959 | Webb ................................. 239/588 |
| 2,966,311 | 12/1960 | Davis ................................. 239/587.1 |
| 3,032,357 | 5/1962 | Shames et al. . |
| 3,034,809 | 5/1962 | Greenberg . |
| 3,143,857 | 8/1964 | Eaton . |
| 3,266,059 | 8/1966 | Stelle . |
| 3,306,634 | 2/1967 | Groves et al. . |
| 3,329,967 | 7/1967 | Martinez et al. . |
| 3,389,925 | 6/1968 | Gottschald . |
| 3,492,029 | 1/1970 | French et al. . |
| 3,565,116 | 2/1971 | Gabin ................................. 285/381.4 |
| 3,612,577 | 10/1971 | Pope . |
| 3,669,470 | 6/1972 | Deurloo . |
| 3,685,745 | 8/1972 | Peschcke-Koedt . |
| 3,754,779 | 8/1973 | Peress . |
| 3,861,719 | 1/1975 | Hand . |
| 3,869,151 | 3/1975 | Fletcher et al. . |
| 3,910,277 | 10/1975 | Zimmer . |
| 3,929,164 | 12/1975 | Richter ................................. 138/120 |
| 4,005,880 | 2/1977 | Anderson et al. . |
| 4,006,920 | 2/1977 | Sadler et al. . |
| 4,023,782 | 5/1977 | Eifer . |
| 4,162,801 | 7/1979 | Kresky et al. . |
| 4,243,253 | 1/1981 | Rogers, Jr. . |
| 4,282,612 | 8/1981 | King . |
| 4,383,554 | 5/1983 | Merriman . |
| 4,396,797 | 8/1983 | Sakuragi et al. . |
| 4,540,202 | 9/1985 | Amphoux et al. . |
| 4,553,775 | 11/1985 | Halling . |
| 4,643,463 | 2/1987 | Halling et al. . |
| 4,645,244 | 2/1987 | Curtis . |
| 4,652,025 | 3/1987 | Conroy, Sr. . |
| 4,669,757 | 6/1987 | Bartholomew . |
| 4,683,917 | 8/1987 | Bartholomew . |
| 4,739,801 | 4/1988 | Kimura et al. . |
| 4,790,294 | 12/1988 | Allred, III et al. . |
| 4,809,369 | 3/1989 | Bowden . |
| 4,842,059 | 6/1989 | Tomek . |
| 4,856,822 | 8/1989 | Parker . |
| 4,865,362 | 9/1989 | Holden . |
| 4,871,196 | 10/1989 | Kingsford . |
| 4,901,927 | 2/1990 | Valdivia ................................. 239/587.3 |
| 4,951,329 | 8/1990 | Shaw . |
| 4,964,573 | 10/1990 | Lipski . |
| 4,972,048 | 11/1990 | Martin . |
| 5,022,103 | 6/1991 | Faist . |
| 5,032,015 | 7/1991 | Christianson . |
| 5,046,764 | 9/1991 | Kimura et al. . |
| 5,134,251 | 7/1992 | Martin . |
| 5,153,976 | 10/1992 | Benchaar et al. . |
| 5,197,767 | 3/1993 | Kimura et al. . |
| 5,220,697 | 6/1993 | Birchfield . |
| 5,254,809 | 10/1993 | Martin . |
| 5,263,646 | 11/1993 | McCauley . |
| 5,265,833 | 11/1993 | Heimann et al. . |
| 5,286,071 | 2/1994 | Storage . |
| 5,288,110 | 2/1994 | Allread . |
| 5,333,787 | 8/1994 | Smith et al. ................................. 239/587.6 |
| 5,340,165 | 8/1994 | Sheppard . |
| 5,368,235 | 11/1994 | Drozdoff et al. . |
| 5,370,427 | 12/1994 | Hoelle et al. . |
| 5,398,977 | 3/1995 | Berger et al. . |
| 5,449,206 | 9/1995 | Lockwood . |
| 5,468,057 | 11/1995 | Megerle et al. . |
| 5,481,765 | 1/1996 | Wang . |
| 5,517,392 | 5/1996 | Rousso et al. . |
| 5,521,803 | 5/1996 | Eckert et al. . |
| 5,531,625 | 7/1996 | Zhong . |
| 5,667,146 | 9/1997 | Pimentel et al. . |

SELF-SUPPORTING RECONFIGURABLE HOSE

This application is a continuation of U.S. Ser. No. 08/308,404 filed Nov. 14, 1994 now abandoned.

This invention relates to the directional control of a hose for carrying a fluid, and more particularly concerns a self-supporting hose, for use with a sprayer such as a shower head, that is configurable to a fixed position to allow the desired position and spray direction.

BACKGROUND

Shower arms are available that allow limited adjustment of the position of the shower head and the direction of spray. Typically, the shower head is pivotally connected to the shower pipe, which allows the user to pivot the shower head to somewhat control the direction of the shower spray, but does not allow the user to change the overall position of the shower head.

SUMMARY

The reconfigurable self-supporting hose allows the user to select the position of the sprayer, as well as the direction of the water spray from the sprayer.

When used in a shower with a shower head, the self-supporting hose gives a user a much more enjoyable and vigorous shower. The user is able to direct the water flow in desired directions, thus allowing both hands to be free. The position of the shower head and the direction of spray from the shower head can be adjusted to remain in the desired position until modified by the user. For instance, a taller user can bend the self-supporting hose upwardly to fit comfortably underneath the shower head. A shorter user can bend the unit down to obtain the maximum benefit of the water spray onto the body. The adjustability (both position and spray direction) is very beneficial. The self-supporting hose will make cleaning the shower walls faster and easier because you can bend the unit to reach every wall.

Generally, the invention disclosed herein includes a hose for transporting liquid from a liquid source, the hose including a self-supporting outer arm structure made of interconnected pieces or beads snapped together. The arm is selectively configurable along at least portions of its length to temporary fixed positions. The structure has a first end and a second end, and has a fluid transport path for transporting fluid from the first end to the second end. The first end of the arm structure is connected to the liquid source in fluid communication with the fluid transport path, and a shower head is connected to the second end.

The self-supporting outer structure can include a plurality of interconnected bead members each moveable with respect to adjacent bead members. The liquid source can be a shower pipe or a plumbing fixture positioned adjacent to a sink.

Other aspects, features and details of the present invention can be more completely understood by reference to the following detailed description of a preferred embodiment, taken in conjunction with the drawings, and from the appended claims.

DETAILED SPECIFICATION

The self-supporting snap-hose 20 is a device used to allow a user to control the direction of the flow of pressurized water or fluid to the particular position (such as height) and in the particular direction the user desires. When used in a shower setting with a shower head 22 (FIG. 12), a user can take a shower and have the option of adjusting the hose to direct the position of the shower head and the direction of spray at any given time. A user can actually adjust the self-supporting snap-hose 20 to rinse off any wall in the shower, including the wall to which the hose is attached. The self-supporting snap-hose 20 is unique in that one can raise or lower the unit and move it from side to side in one motion, without locking it in place. It will stay in the desired configuration with the shower head 22 position and spray direction fixed until moved again.

Figure 1:
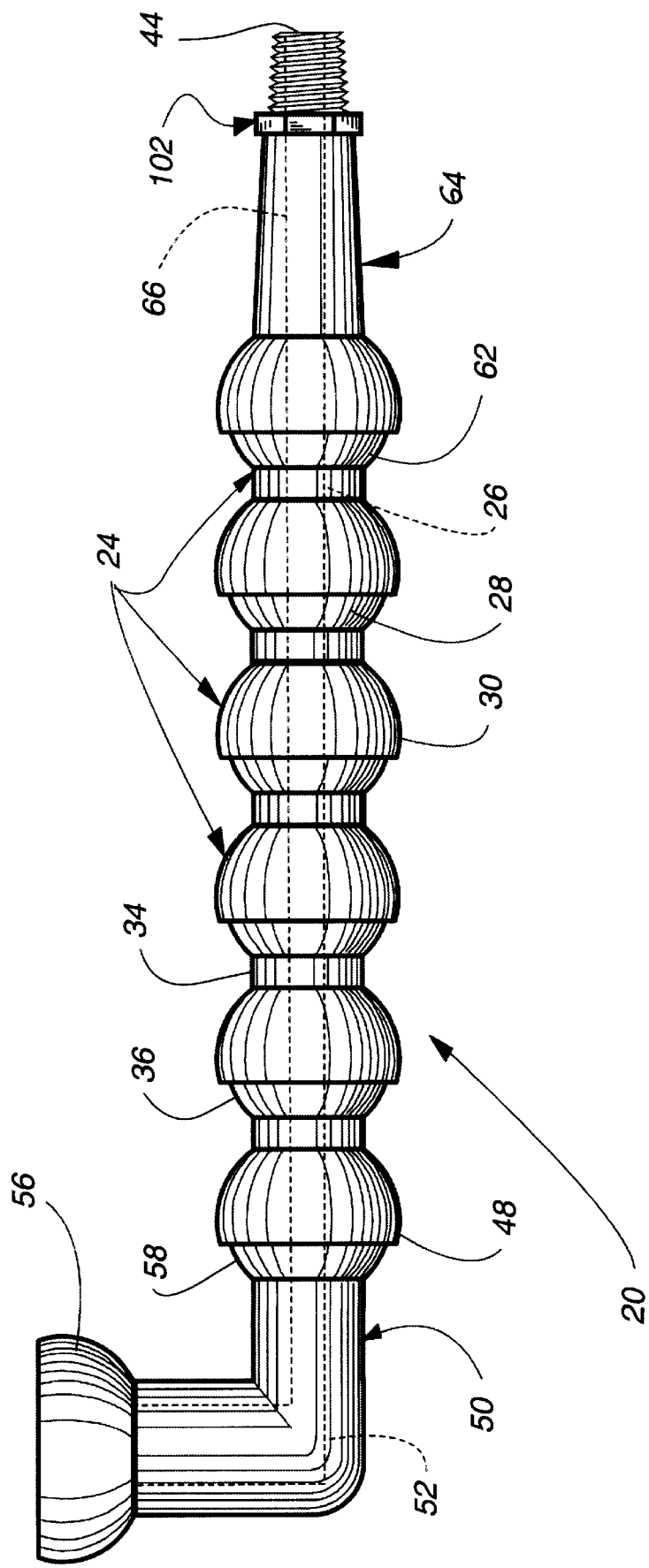
FIG. 1 is a side view of the external structure of the self-supporting hose of the present invention.
Figure 12:
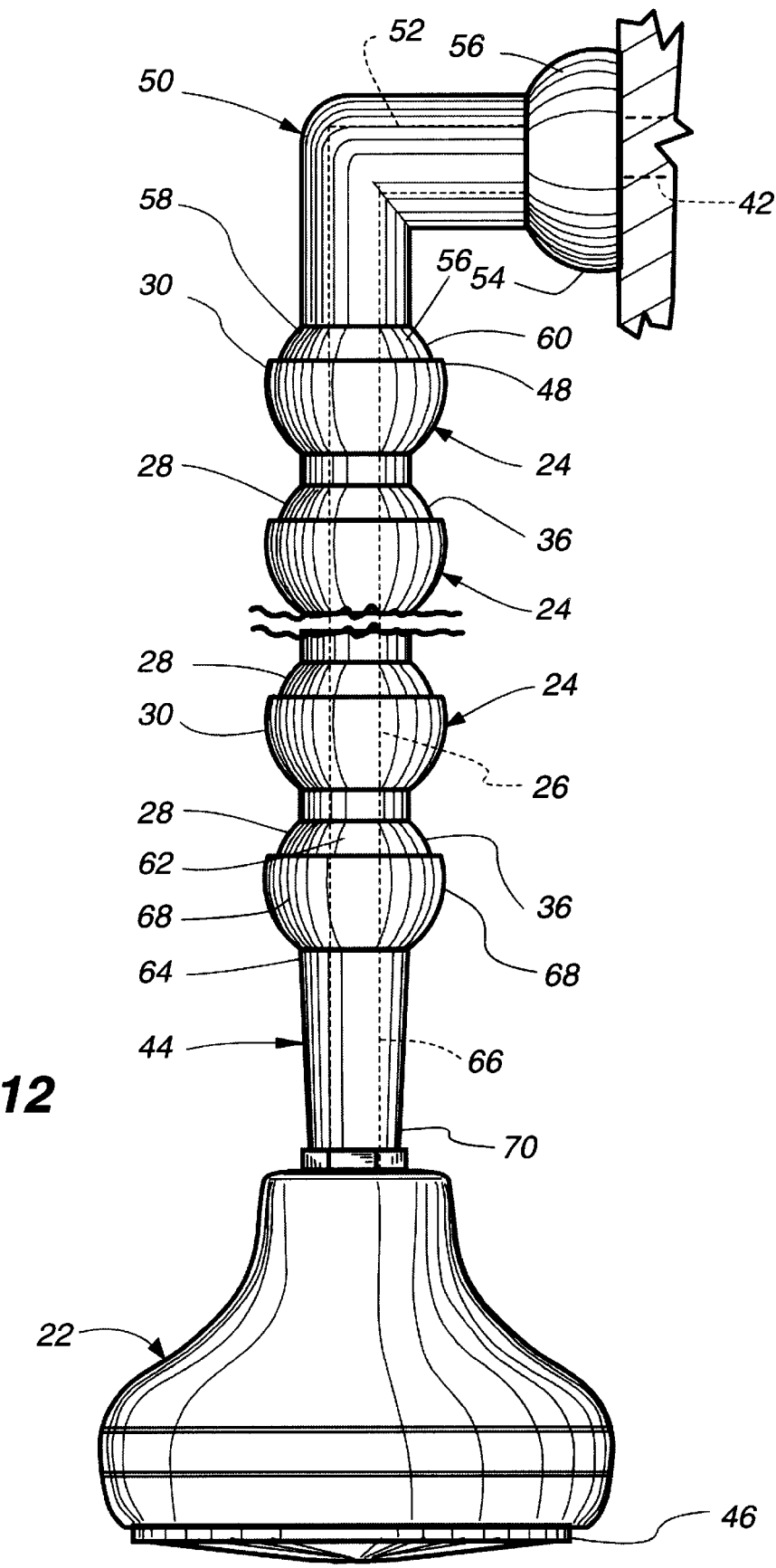
FIG. 12 is a side view of the self-supporting hose of the present invention, with one end attached to a shower pipe (not shown) on a shower wall, and the other end attached to a shower head.
Figure 13:
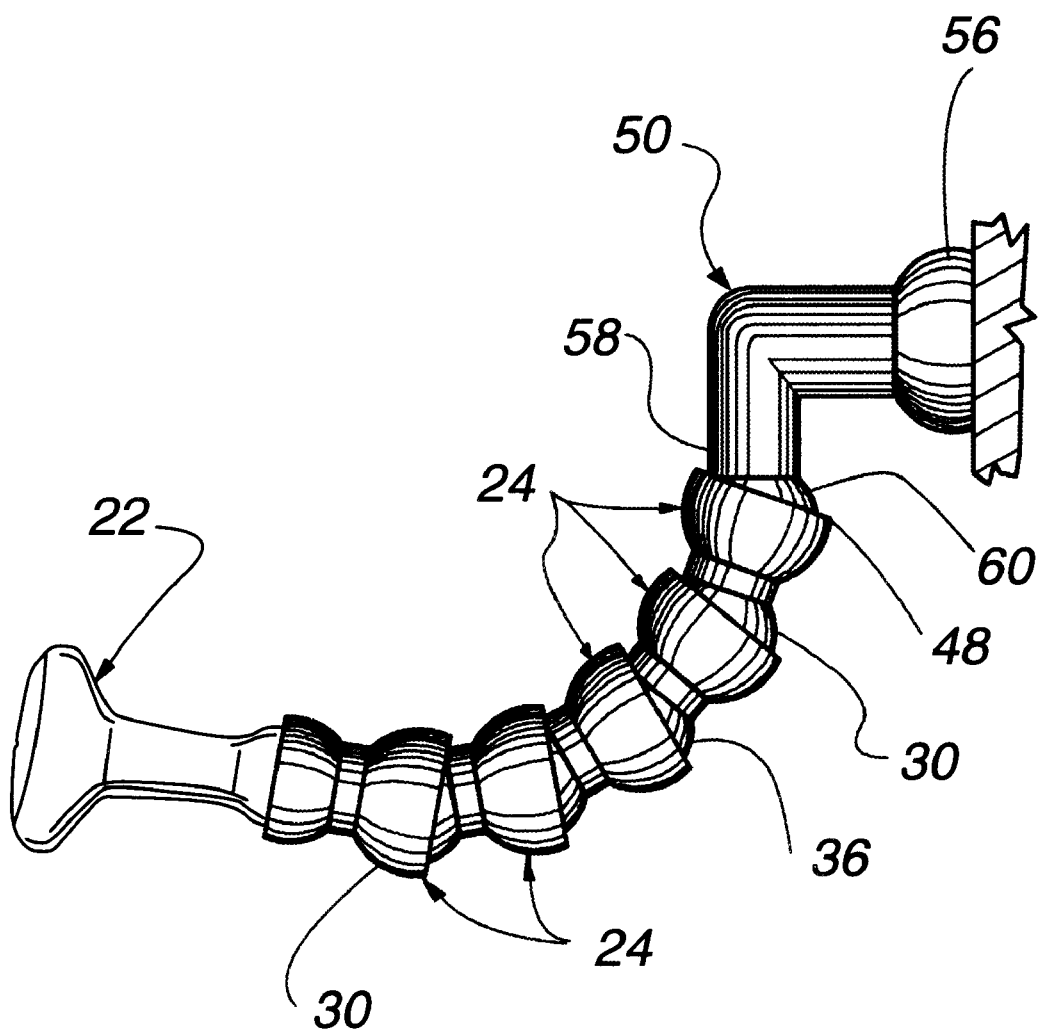
FIG. 13 is a side view similar to FIG. 5, showing the self-supporting hose bent in a particular shape to position the shower head.
Figure 14:
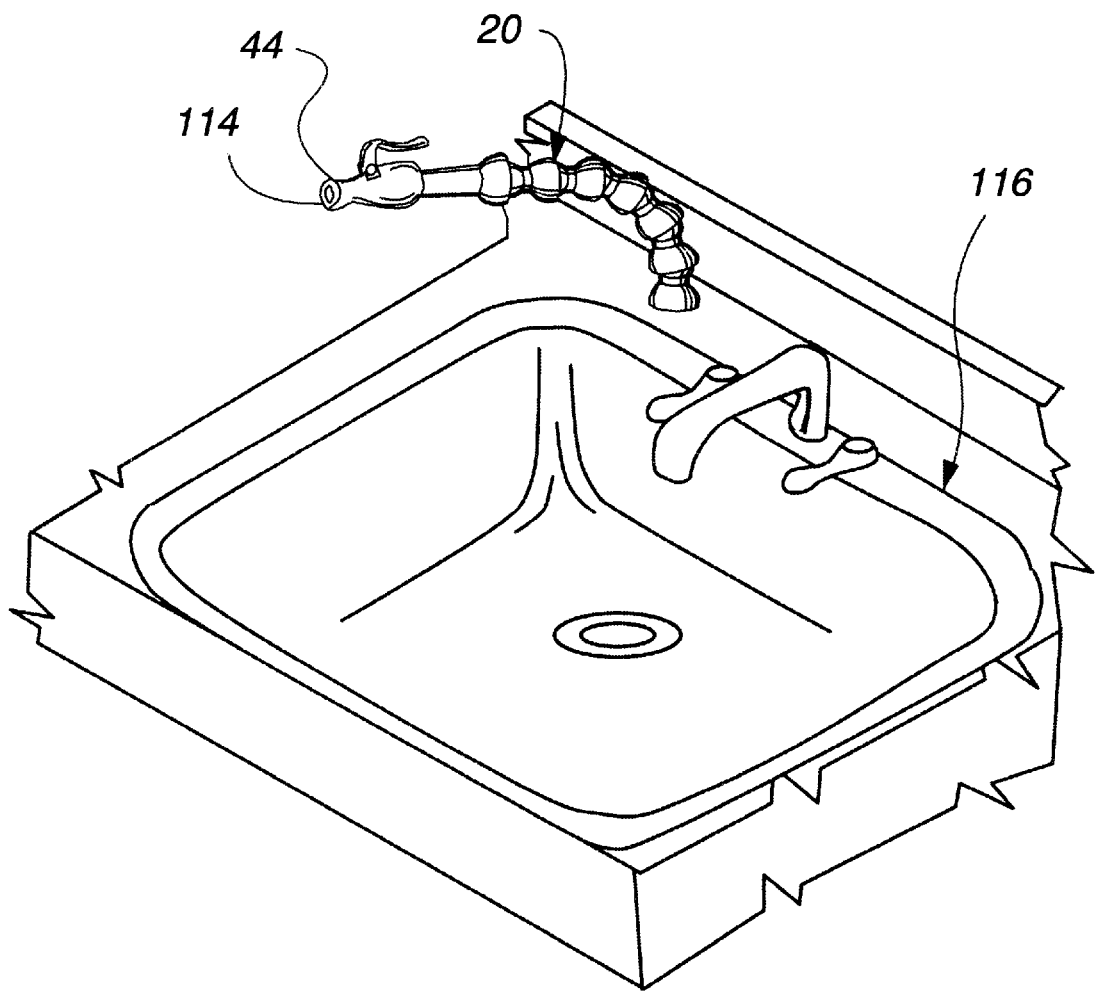
FIG. 14 is a perspective view of the self-supporting hose as applied to a sink.

The self-supporting snap-hose 20, as shown in FIGS. 1, 12 and 13 is another structure and, includes a plurality of ball and socket bead members 24 attached together to form an elongated, bendable hose 20 defining an elongated cavity 26 formed along its entire length. The bead members each have a male end 28 and a female end 30. Each female end defines a recess, and each male end 28 defines an outer surface 36 having a partially spherical shape. A cavity is formed entirely through each bead member. The female and male end of each bead are spaced relatively closely adjacent to each other, connected by a short, cylindrical throat portion 34. The close spacing allows the snap-hose to be bent into relatively extreme shapes.

The recess in the female end 30 receives the male end 28 of an adjacent bead member 24 by snapping together so that each bead member can be pivoted and rotated with respect to one another. The fit of the male end 28 in the female end 30 is tight enough to create a friction fit, or a resistance between snapped-together beads, that allows the beads to maintain their position relative to one another without undesired relative movement unless an adequate force is applied to change the configuration. A plurality of bead members 24 are snapped together to form the exterior structure of the self-supporting snap-hose 20. The bead members 24 are available in different colors, and a suitable bead member is made by Cedarberg Inc. in Minnesota. By snapping the single bead members 24 together a versatile and bendable self-supporting snap-hose 20 of virtually any desired length can be constructed.

A tube 38 is inserted through the cavity 26 formed along the length of the snap-hose 20. The tube carries the fluid from the fluid source 40, such as the shower pipe 42, to the outlet port 44 of the hose 20, which can be connected to a sprayer 26. The tube 38 does not adversely affect the flexibility of the snap-hose 20, and reduces the occurrence of leakage past the rotatable and pivotable connection between the beads 24.

The self-supporting outer snap-hose 20 (arm structure) has a first end 48 which is pivotally attached to an end fixture 50 which connects the hose to the fluid source 40, such as a shower pipe 42. The end fixture 50, as shown in FIGS. 1, 7, 8, 9, 12, 13 and 14, preferably an L-shaped elbow, has a cavity 52 formed therethrough. A first end 54 of the end fixture 50 defines an internal thread 53 along a portion of the length of the cavity 52 for threadedly receiving the threaded outer surface 55 of the shower pipe 42. An outwardly extending annular shroud 56 is formed around the end fixture 50 to protect the threaded joint from moisture. A second end 58 of the end fixture 50 defines an internal thread 55 along a portion of the length of the cavity 52 for threaded connection to the internal structure of the snap-hose 20, as described below. The second end 58 of the end fixture 50 also defines a partially spherical outer surface 60 that replicates the male end 28 of a bead member 24 for insertion into the female end 30 of the adjacent bead member 24. Preferably, both ends of the end fixture 50 are threaded with ½" pipe threads.

The second end 62 of the self-supporting snap-hose 20 is attached to an end connector 64, as shown in FIGS. 1, 7, 8, 9, 12, 13 and 14, which facilitates the further connection of a sprayer, such as a shower head 22. The end connector 64 defines a cavity 66 extending its entire length, and has a first 68 and second 70 ends, each defining an aperture 72, 74 respectively in communication with the cavity 66. The first end 68 of the end connector 64 defines a large aperture 72. The first end 68 of the end connector 64 receives the male end 28 of the adjacent bead member 24. The aperture 74 is formed in the second end 70 of the end connector 64. The end connector 64 facilitates the connection of the second end 62 of the hose 20 to a sprayer, such as a shower head 22.

The snap-hose 20 can be assembled in any length, as you can see in FIG. 1. The middle pieces (bead members) are all the same and may be snapped together to achieve any desired length. The inner parts 80 of the self-supporting flexible hose 20 are shown in FIGS. 2 through 6. A braided pressurized flex tube 38 for insertion through the cavity 26 formed through the entire length of the interconnected bead members 24 can be cut to any length to accommodate any length snap-hose 20. The tube 38 has a first end 82 adjacent the first end 48 of the snap-hose 20, and a second end 83 adjacent the second end 62 of the snap-hose 20. As mentioned above, the tube facilitates the efficient and leak-free transport of fluid through the hose.

Figure 2:
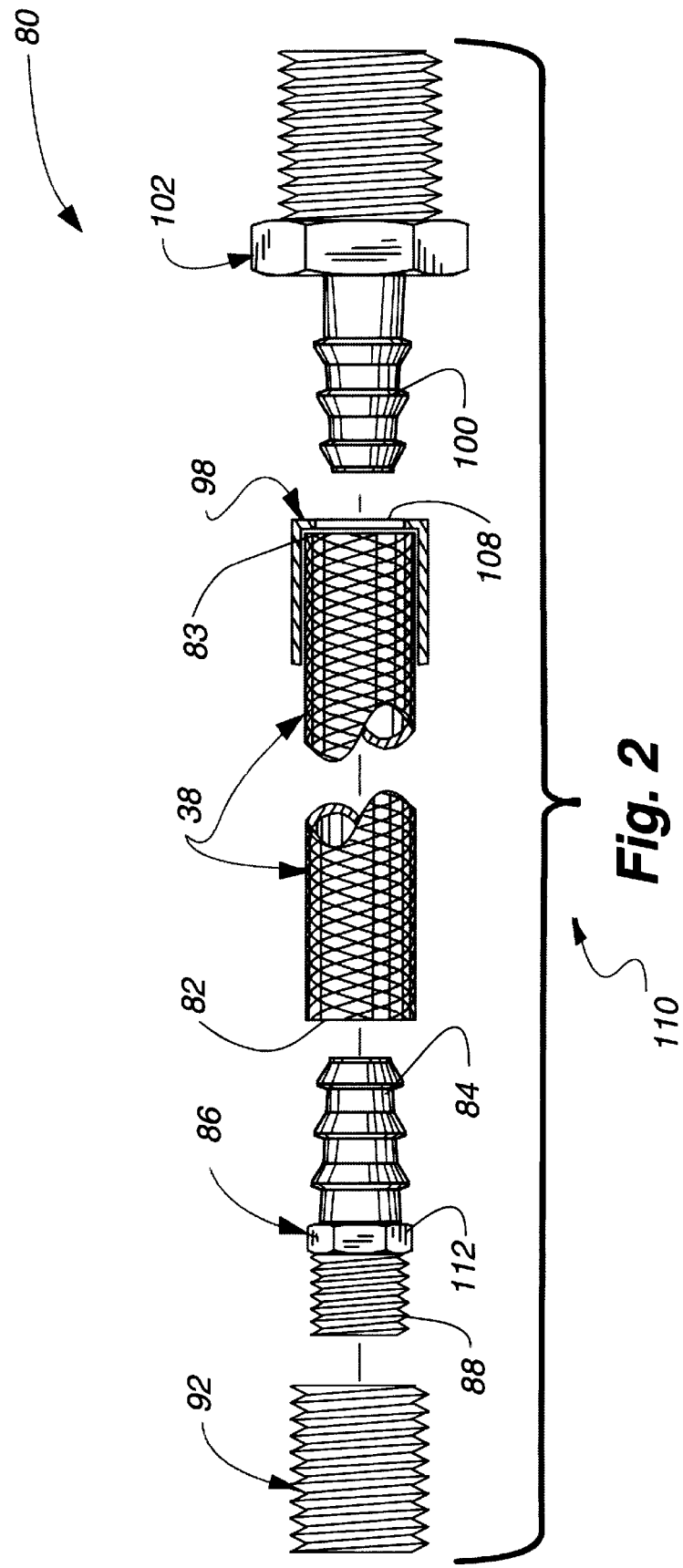
FIG. 2 is an exploded view of the parts internal to the self-supporting hose of the present invention.
Figure 3:
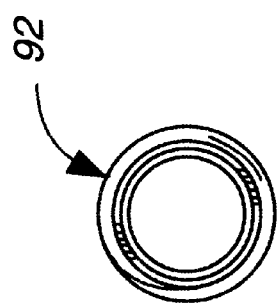
FIGS. 3 through 6 are further detailed views of certain parts internal to the self-supporting hose of the present invention.
Figure 4:
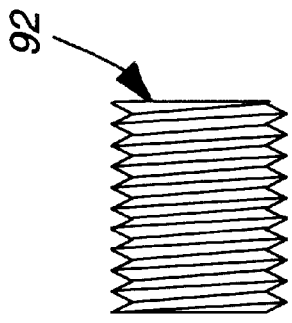
Figure 6:
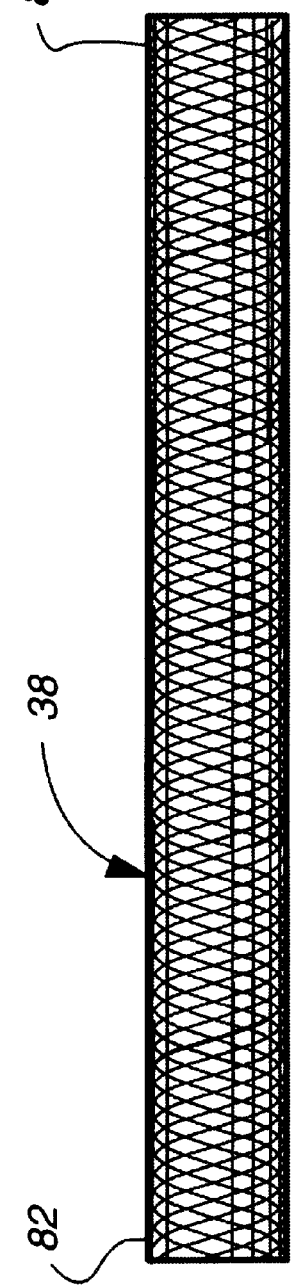
Figure 5:
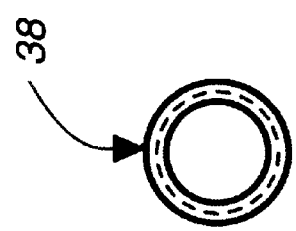
Figure 9:
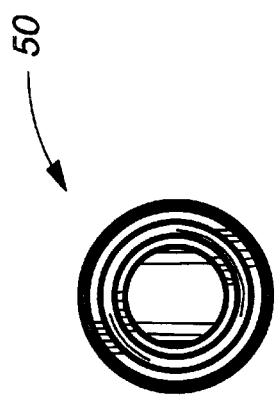
FIG. 9 is an end view of the small end of the elbow.
Figure 8:
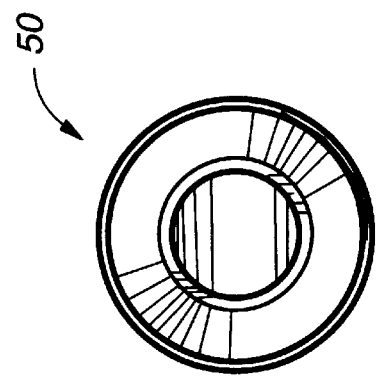
FIG. 8 is a top view of the top end of the elbow.
Figure 11:
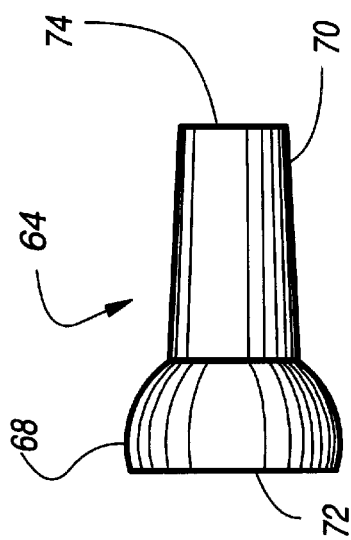
FIG. 11 is a side view of the nozzle end.
Figure 7:
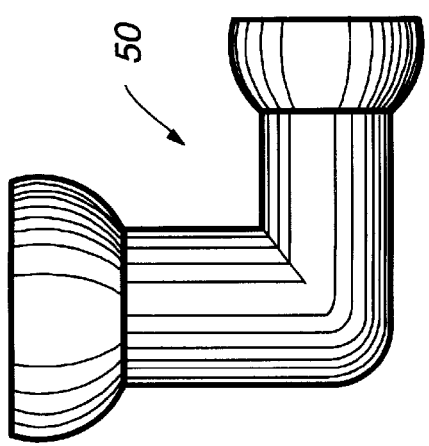
FIG. 7 is a side view of the elbow.
Figure 10:
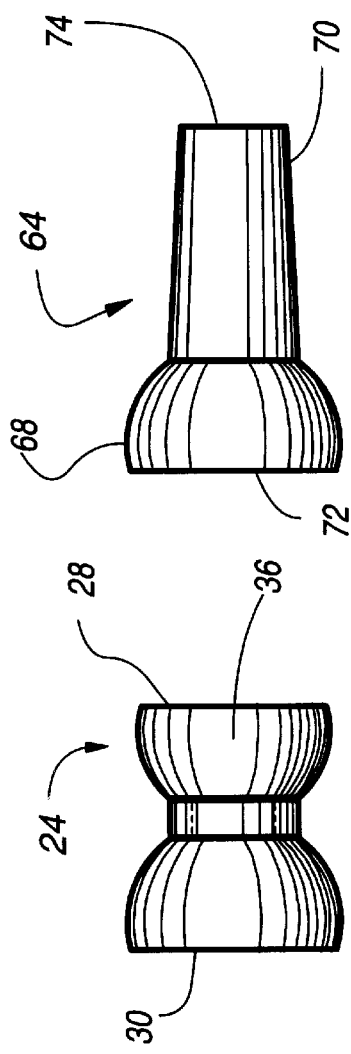
FIG. 10 is a side view of a snap piece (bead) used to make the outer structure.

Generally, as best shown in FIGS. 1, 2 and 12, the first end 48 of the snap-hose 20 is attached to the second end 58 of the end fixture 50 to allow fluid communication therebetween by inserting the barbed end 84 of a first nipple 86 into the first end 82 of the tube 38 to engage the inner walls of the tube, and threading the threaded opposite end 88 of the first nipple into a threaded inner bore 90 of a bushing 92. The bushing has a threaded outer surface 94 for threaded insertion into the second end 58 of the end fixture 50. The female end 30 of the first bead member 24 at the first end 48 of the hose 20 is then snapped over the spherical outer surface 56 formed at the second end 58 of the end fixture 50. This construction, described in greater detail below, allows a fluid-tight connection between the shower pipe 42, end fixture 50, bushing 92, barbed nipple 86, and tube 38 for effective fluid passage therethrough. The male/female bead connection between the second end 58 of the end fixture 50 and the first bead on the hose 20 allows the rotational and pivotal movement of the hose 20 with respect to the end fixture 50.

Also generally, as best shown in FIGS. 1, 2 and 12, the second end 62, 96 of the hose 20 and tube 38 are attached to the sprayer, such as the shower head 22, by inserting the second end of the tube 83 into a ferrule 98, inserting the ferrule through the end connector 64 to engage the flange in the end connector, inserting the ribbed end 100 of the nipple member 102 through the aperture 74 formed in the flange 78 from the other side to pass through the end of the ferrule 98 and to insert into the tube 38 to engage the inner walls of the tube. The flange 78 on the end connector 64 is thus clamped between the second end of the tube 83 and an annular shoulder 104 formed on the nipple member. The opposite end 106 of the nipple member is externally threaded for threaded connection to a sprayer, such as the shower head.

The first end 68 (female end) of the end connector 64 receives the male end 28 of the adjacent (last) bead member 24 at the second end 62 of the hose 20 to provide the rotational and pivotal movement between the hose 20 and the end connector 64, and thus the sprayer 46. This construction, described in greater detail below, allows a fluid-tight connection between the second end of the tube 83, the end connector 64, the nipple member 102 and the sprayer 46 for efficient fluid passage therethrough. The male/female bead connection between the female end 68 of the end connector 64 and the last bead 24 on the second end 62 of the hose 20 allows the rotational and pivotal movement of the sprayer 46 with respect to the snap-hose 20.

In describing the structure of the end fixture 50 and end connector 64 in greater detail, threaded barbed nipples 86, 102 are provided at either end of the tube 38. The self-supporting hose 20 also requires a nylon bushing 92 which screws into the second end 58 of the elbow 50 (see FIGS. 4-1, 7 and 8). This allows a smaller threaded nipple 86 at the first end of the tube 38, which much pass through the inside diameter of the cavity 26 formed through the hose 20. This feature is very important with respect to the assembly of the hose 20.

FIG. 2 shows a brass sleeve or ferrule 98 used in attaching the second end 83 of the tube 38 to the nipple member 102. In the end of the ferrule 98 there is an aperture 108 sized to allow the barbed end 100 of the nipple 102 to pass through it and into the tube 38. The purpose of the sleeve 98 is to keep the tube 38 from sliding out of the end connector 64. The sleeve 98 creates a bigger abutment end at the second end 96 of the tube 38, which will butt against a flange that is on the inside of the second end 70 of the end connector 64.

The snap-hose 20 (made up of the interlinked bead members 24) does not easily hold up to the standard household pressure in the water line without leaking. By threading the small end 58 of the elbow 50 (FIG. 4-1) and preferably using a ⅜" by ¼" threaded first barbed nipple 86, the braided flexible tube 38 having the first nipple attached to the first end 82 thereof can be run through the cavity 26 of the hose 20. The tube 38 is an FDA approved, braided clear tube. By using the tubing 38, barbed nipples 86, 102, and a couple of other inner parts (bushing 92, ferrule 98), an inside system 110 is constructed that can handle the household water line pressure within the hose, and still have the benefits of the original range of motion of the hose 20 itself.

The biggest challenge to making the hose 20 cost effective is to put together an inside system 110 that can withstand at least household water line pressure inside the cavity 26 in the hose 20. The cavity 26 is preferably only ¾" in diameter. The construction of the hose 20 requires that the bead members 24 be snapped to the end fixture 50 and end connector 64 at the same time the ends 82, 83 of the inside tubing 38 are connected as described above.

To do this given the described structure, insert the small first barbed nipple 86 (FIG. 2) into the first end 82 of the tube 38. The barbed ends 84, 100 of both the first nipple 86 and the nipple member 102 are preferably ⅜". The inside diameter of the tube 38 is also preferably ⅜". The outside diameter of the tubing is preferably ⅝". By heating the ends of the tubing, the barbed nipples 86, 102 will seat very securely in the tubing 38. One way to effectively heat the ends of the tubing is to dip the end of the tube into hot water (approximately 170 degrees Fahrenheit) for about 30 seconds. Once the first barbed nipple 86 is securely in place, insert the other end through the snap-hose 20.

Then, using the end connector 64 for the second end 62 of the hose 20 (FIG. 4-5, 9, 10) (which will eventually snap onto the last end bead 24 at the second end 83 of the hose 38), insert the sleeve 98 (FIG. 2, preferably ferrule size 7329) into the end connector 64 so that the tapered end of the sleeve 98 butts against the inside of the flange formed on the second end 70 of the end connector 64. Insert the second end 96 of the tube 38 into the sleeve 98, which is inside connector 64, while the tube 38 is still hot. Then quickly and firmly press the barbed nipple member 102 (FIG. 2-5) into the second end 70 of the end connector 64. The barbed nipple 100 is thus passed through the aperture 74 in the end connector 64, the sleeve 98 and into the tubing 38. By holding the tube adjacent the first end 68 of the end connector 64, the flexible tubing will be stiff enough to securely seat the barbed nipple 100 into the second end of the tube 38 for a snug fit. The first end of the end connector is then snapped onto the last bead member on the second end of the hose.

The first end 82 of the tube 38 (with the first nipple 86) should at this point hang down through the hose 20 to approximately ¼" short of the first end 48 of the hose 20. Then thread the bushing 92 into the small end 58 of the end fixture 50. The bushing 92 is preferably nylon with ½" outside pipe threads, and ¼" inside pipe threads. Thread the bushing 92 into the second end 55 of the end fixture 50 until it is flush with the second end of the end fixture 50. Bring the end fixture 50 up to the snap-hose 20 to thread the threaded end 88 of the first nipple 86 (FIG. 2-2) into the inside threads of the bushing 92. Once the threads have engaged, pull on the end fixture 50 to stretch the inside tubing 38 enough to grasp the hex portion 112 of the first nipple 86 (preferably made of brass). This allows one to apply adequate turning power (by hand) on the end fixture 50 to complete threading the first nipple 86 into the bushing 92, and the bushing 92 into the second end 58 of the end fixture 50 while not turning the inside tube 38 at the same time. The end fixture 50 is turned until the nipple 86 is completely threaded into the bushing 92. Once the nipple is tightly connected to the bushing, it will then turn the outside of the bushing 92 further into the second end of the end fixture, making both connections secure and preferably water tight. Remove the vise grip and the system will naturally pull together by removing the tension from the tubing. Snap-connect the male end 58 of the end fixture 50 into the female end 30 of the first end bead 24 of the snap-hose 20 to finish the construction.

The first end 54 of the end fixture 50 (FIG. 12) screws directly onto the shower pipe 42. First remove any existing showerhead from the shower pipe. If necessary, bend the self-supporting snap-hose 20 away from shower wall and thread the first end 54 of the end fixture 50 onto the shower pipe 42. Turn the end fixture 50 until snug on the shower pipe 42, and then turn to obtain the desired initial direction of the snap-hose 20.

To attach the shower head 22 to the second end 62 of the snap-hose 20, using the threaded connectors screw the shower head 22 onto the second end 70 of end connector 64. Teflon thread tape can be used to alleviate fitting leaks, if any.

The self-supporting hose 20 allows a user to position the shower head 22 and direct the shower spray in any of a great number of desired positions not before available. The interconnected bead members 24 pivot and rotate with respect to one another allow the body of the hose 20 to be configured in many ways, and the free end of the hose 20 to be moved to many temporarily fixed positions. The pivotal and rotational connection between the end of the hose 20 and the sprayer 46 or shower head 22 allows the sprayer to be pivoted and oriented as desired to control the direction of the spray. The user can direct the water flow in extreme directions, without locking the hose 20 in place, and while leaving both hands free.

The pressurized snap-hose 20, without the shower head 22, is also useful in many other areas. For example: a certain length of the hose, with a different sprayer 114 could be used in beauty salon sinks, restaurant sinks 116, as shown in FIG. 12, or anywhere versatility is needed in controlling the position and direction of water flow.

The idea and design are both simple and basic. By combining a flexible snap together hose with a flexible tube positioned therethrough, a pressurized self-supporting flexible hose 20 is provided that allows for a high level of control over the position and direction of water flow.

Working Example

The following provides a step-by-step working example of how to make a preferred embodiment of the present invention:

1. Provide a flexible tube of desired length and diameter;
2. Provide appropriately sized (diameter slightly greater than the flexible tube diameter) movably interconnected bead members and fittings as supplied by Cedarberg Industries or equivalent;
3. Attach end nipples to the flexible tube and thread movably interconnected bead members onto the flexible tube, snapping the bead members together per manufacturer's instructions;
4. Provide a shower head and attach the shower head to one end of the flexible tube/movably interconnected bead member assembly; and
5. Attach the end of the flexible tube/movably interconnected bead member assembly opposite the shower head to the water supply pipe.

Although the present invention has been described with a certain degree of particularity, it is understood that the present disclosure has been made by way of example, and changes in detail or structure may be made without departing from the spirit of the invention, as defined in the appended claims.

What is claimed is:

1. A flexible shower arm for connecting a shower head to a shower pipe, said arm comprising:
    a plurality of movably interconnected bead members forming an outer structure and defining a cavity formed along the entire length of said outer structure, said outer structure having a first and second ends;

a tube positioned in the cavity and extending from said first end to said second end of said outer structure, said tube having first and second ends;

an end fixture having a first end attached to the shower pipe and a second end moveably attached to said first end of said outer structure, said second end of said end fixture defining internal threads;

an end connector having a first end operably attached to said second end of said outer structure, and a second end attached to the shower head;

a bushing, defining a bore, and having internal threads and external threads, said bushing being received in said second end of said end fixture;

a first nipple having a first end defining external threads and being threadedly received in said bore of said bushing, and a barbed second end for insertion into said first end of said tube to conduct liquid from said liquid source into said tube; and a second nipple formed on said end connector for insertion into said second end of said tube to conduct liquid from said tube to the shower head.

2. A flexible arm for connecting a spray head to a sink, said arm comprising:

a plurality of movably interconnected bead members forming an outer structure and defining a cavity formed along the entire length of said outer structure, said outer structure having a first and second ends and being moveable into a temporary fixed shape;

a tube positioned in the cavity and extending from said first end to said second end of said outer structure, said tube having first and second ends;

an end fixture having a first end attached to the shower pipe and a second end moveably attached to said first end of said outer structure, said second end of said end fixture defining internal threads;

an end connector having a first end operably attached to said second end of said outer structure, and a second end attached to the spray head;

a bushing, defining a bore, and having internal threads and external threads, said bushing being received in said second end of said end fixture;

a first nipple having a first end defining external threads and being threadedly received in said bore of said bushing, and a barbed second end for insertion into said first end of said tube to conduct liquid from said liquid source into said tube; and a second nipple formed on said end connector for insertion into said second end of said tube to conduct liquid from said tube to the spray head.

* * * * *

UNITED STATES PATENT AND TRADEMARK OFFICE
CERTIFICATE OF CORRECTION

PATENT NO. : 6,164,570  
DATED : December 26, 2000  
INVENTOR(S) : Smeltzer

Page 1 of 1

It is certified that error appears in the above-identified patent and that said Letters Patent is hereby corrected as shown below:

<u>Column 8, claim 2,</u>  
Lines 7-8, "shower pipe" should be -- sink --

Signed and Sealed this

Twenty-sixth Day of March, 2002

Attest:

JAMES E. ROGAN  
*Attesting Officer*   *Director of the United States Patent and Trademark Office*